US007571411B2

(12) United States Patent  (10) Patent No.: US 7,571,411 B2
Hentschke et al.  (45) Date of Patent: Aug. 4, 2009

(54) METHODS AND APPARATUS FOR PROVIDING FLEXIBLE TIMING-DRIVEN ROUTING TREES

(75) Inventors: Renato Fernandes Hentschke, Porto Alegre (BR); Marcelo de Oliveira Johann, Porto Alegre (BR); Jagannathan Narasimhan, Millwood, NY (US); Ricardo Augusto de Luz Reis, Porto Alegre (BR)

(73) Assignee: International Business Machines Corporation, Armonk, NY (US)

( * ) Notice: Subject to any disclaimer, the term of this patent is extended or adjusted under 35 U.S.C. 154(b) by 575 days.

(21) Appl. No.: 11/330,937

(22) Filed: Jan. 12, 2006

(65) Prior Publication Data

US 2007/0159984 A1  Jul. 12, 2007

(51) Int. Cl.
*G06F 17/50* (2006.01)
(52) U.S. Cl. .......................................... 716/12; 716/13
(58) Field of Classification Search .............. 716/10–14
See application file for complete search history.

(56) References Cited

U.S. PATENT DOCUMENTS 6,898,774 B2 *  5/2005  Alpert et al. ................... 716/13
6,952,813 B1 *  10/2005  Rahut ............................ 716/6
7,010,767 B2 *  3/2006  Elassaad et al. ................ 716/6

OTHER PUBLICATIONS

C.J. Alpert et al., "Fast and Flexible Buffer Trees that Navigate the Physical Layout Environment," Proc. of the 41$^{st}$ DAC, pp. 24-29, Jun. 2004.
C.J. Alpert et al., "Prim-Dijkstra Tradeoffs for Improved Performance-Driven Routing Tree Design," IEEE Trans On Computer-Aided Design of Integrated Circuits and Systems, vol. 14, No. 7, pp. 1-17, Jul. 1995.
K.D. Boese et al., "Near-Optimal Critical Sink Routing Tree Constructions," IEEE Trans. On Computer-Aided Design of Integrated Circuits and Systems, vol. 14, No. 12, pp. 1-40, Jul. 1995.
M. Borah et al., "An Edge-Based Heuristic for Steiner Routing," IEEE Transactions on Computer-Aided Design of Integrated Circuits and Systems, vol. 13, No. 12, pp. 1563-1568, Jul. 1994.

(Continued)

*Primary Examiner*—Jack Chiang
*Assistant Examiner*—Binh C Tat
(74) *Attorney, Agent, or Firm*—Brian P. Verminski; Ryan, Mason & Lewis, LLP

(57) ABSTRACT

A method of producing a flexible timing-driven routing tree is provided. Two or more target nodes are sorted in accordance with data criticality. A source-sink grid is built from one or more source nodes and the two or more target nodes. An initial routing tree is built comprising the one or more source nodes. A routing tree generation algorithm is executed on the initial routing tree, utilizing the sorted two or more target nodes and the source-sink grid in accordance with a user-defined timing factor to construct a flexible timing-driven routing tree. The user-defined timing factor specifies an extent of isolation for a routing path from a given one of the one or more source nodes to a given one of the two or more target nodes.

1 Claim, 14 Drawing Sheets

OTHER PUBLICATIONS

J. Cong et al., "Efficient Algorithms for the Minimum Shortest Path Steiner Arborescence Problem with Applications to VLSI Physical Design," IEEE Transactions On Computer-Aided Design of Integrated Circuits and Systems, vol. 17, Issue 1, pp. 24-39, Jan. 1998.

J. Cong et al., "Provably Good Performance-Driven Global Routing," IEEE Transactions on Computer-Aided Design, vol. 11, No. 6, pp. 739-752, Jun. 1992.

J.-M. Ho et al., "New Algorithms for the Rectilinear Steiner Tree Problem," IEEE Transactions on Computer-Aided Design, vol. 9, No. 2, pp. 185-193, Feb. 1990.

X. Hong et al., "Performance-Driven Steiner Tree Algorithms for Global Routing," Proc. of the 30$^{th}$ ACM/IEEE Design Automation Conference, pp. 177-181, Jun. 1993.

S.-W. Hur et al., "Timing-Driven Maze Routing," IEEE Transactions on Computer-Aided Design of Integrated Circuits and Systems, vol. 19, No. 2, pp. 234-241, Feb. 2000.

S. Prasitjutrakul et al., "A Timing-Driven Global Router for Custom Chip Design," Proc. of the Int. Conf. on Computer-Aided Design, pp. 48-51, Nov. 11-15, 1990.

K. Suzuki et al., "A Hardware Maze Router with Application to Interactive Rip-Up and Reroute," IEEE Transactions on Computer-Aided Design, vol. CAD.-5, No. 4, pp. 466-476, Oct. 1986.

M. Johann et al., "A New Bidirectional Heuristic Shortest Path Search Algorithm," International ICSC Congress on Artificial Intelligence and Applications, Australia, 7 pages, Dec. 2000.

H.J. Xu et al., "An Efficient Hierarchical Timing Driven Steiner Tree Algorithm for Global Routing," Proc. Of the ASP-DAC, 6 pages, 2002.

* cited by examiner

- ■ NET DRIVER
- ● NET SINK
- ○ STEINER POINT
- ▲ CRITICAL SINK

FIG. 3

**Algorithm $A^*$ ($s$, $t$, $G$):**
*Input:* Graph $G = (V, E)$, source $s$, target $t$
*Output:* A shortest path between $s$ and $t$.
1. Set $g(s) = 0$.
2. Create an open list $L$ and insert $s$ into $L$.
3. while (target $t$ is not closed && $L$ is not empty) do
    a. Remove the first vertex $v$ from $L$.
    b. Mark $v$ as closed.
    c. if ($v \neq t$)
        I. for each vertex $u$ that is adjacent to $v$ that has not yet been closed do
            i. $g(u) = g(v) + c(v, u)$
            ii. $h(u)$ = heuristic cost estimate of a path from $u$ to $t$.
            iii. $f(u) = g(u) + h(u)$.
            iv. Assign $v$ as predecessor vertex of $u$.
            v. Insert $u$ into the appropriate location ordered by the value of $f(u)$ into $L$.
        end for each
    end if
  end do
4. if ($t$ is closed)
    Output the shortest path from $s$ to $t$ by tracing the predecessor vertices from $t$ to $s$.
  else
    Report that $t$ is unreachable from $s$.
  end if
end Algorithm $A^*$ ($s$, $t$, $G$)

FIG. 4

Algorithm $A^*_{mult}(S, T, G)$:
*Input*: Graph $G = (V, E)$, a set $S$ of sources, a set $T$ of targets
*Output*: A shortest path between some source $s \in S$ and some target $t \in T$.
1. Set $g(s) = 0$, $\forall s \in S$.
2. Create an open list $L$ and insert each $s \in S$ into $L$.
3. while (no target $t \in T$ has been closed && $L$ is not empty) do
    a. Remove the first vertex $v$ from $L$.
    b. Mark $v$ as closed.
    c. if $(v \notin T)$
        I. for each vertex $u$ that is adjacent to $v$ that has not yet been closed.
            i. $g(u) = g(v) + c(v, u)$.
            ii. $h(u) = $ is $\min_{t \in T} h_t(u)$, where, $h_t(u)$ is the heuristic estimate of the length of the path from $u$ to $t$.
            iii. Assign $v$ as predecessor vertex of $u$.
            iv. Insert $u$ into the appropriate location ordered by the value of $f(u)$ into $L$.
        end for
    end if
    end while
4. if ($L$ is not empty)
        Output the shortest path to $t$ by tracing the predecessor vertices from $t$ to a source $s \in S$ and return success.
    else
        Report that no $t \in T$ is reachable from any $s \in S$ and return failure.
    end if
end Algorithm $A^*_{mult}(S, T, G)$

FIG. 5

```
Algorithm A*_Steiner(s, T, G):
Input: Graph G = (V, E), A source vertex s, A set T of sink vertices.

Output: A Steiner tree that connects vertices in {s} ∪ T with minimum cost.
    1. fail = false; S = {s}
    2. while (T is not empty && !fail)
            a. Apply A*_mult(S, T, G) and find the shortest path P
               from S to some t ∈ T
            b. if A*_mult(S, T, G) == fail then
                    1. fail=true
                    2. break
                    end if
            c. Set T = T - {t}
            d. Set S = S ∪ V_st, where V_st is the set all vertices
               in the path P including t.
            end while
    3. if (fail == false && T is empty)
               Output the Steiner tree and return success
            Else
               return failure
end Algorithm A*_Steiner(s, T, G)
```

FIG. 6

Algorithm Critical-only $(s, T, G)$
Input: Graph $G = (V, E)$, A source vertex $s$, A set $T$ of sink vertices ordered by criticality.

Output: A Steiner tree that connects vertices in $\{s\} \cup T$ such that timing to critical targets in $T$ is minimized and as a secondary objective cost is minimized.
1. fail = false; $S = \{s\}$
2. while ($T$ is not empty && !fail)
   a. Let $T_c \subseteq T$ be the set of targets that are most critical such that all targets in $T_c$ have the same criticality.
   b. fail = $A^*_{Steiner}(S, T_c, G)$. (find the best Steiner tree connecting vertices in $S \cup T_c$.) Use all targets in $T$ for biasing which is explained in Section 4.2
   c. if (fail==true)
      break
   d. Set $T = T - T_c$
   e. Set $S = S \cup V_{Steiner}$, where $V_{Steiner}$ is the set of all vertices in the Steiner tree generated in Step 2b.
   end while
3. if (fail == false && $T$ is empty)
   Output the Steiner tree and return success
end Algorithm Critical-only $(S, T, G)$

FIG. 7

Procedure Heuristic_Target_Distance $(v, T, G)$
Input: Vertex $v$, Set of target vertices $T$, Graph $G$.
Output: Value of the heuristic estimate $h(v)$
  1. Let $T_c \subseteq T$ be the set of target that are most critical in $T$ such that all targets in $T$ have the same criticality.
  2. Let $t \in T_h$ be the target closest to $v$
  3. $h(v)$ = heuristic estimate from $v$ to $t$
return $h(v)$
end Heuristic_target_distance $(v, T)$

FIG. 8

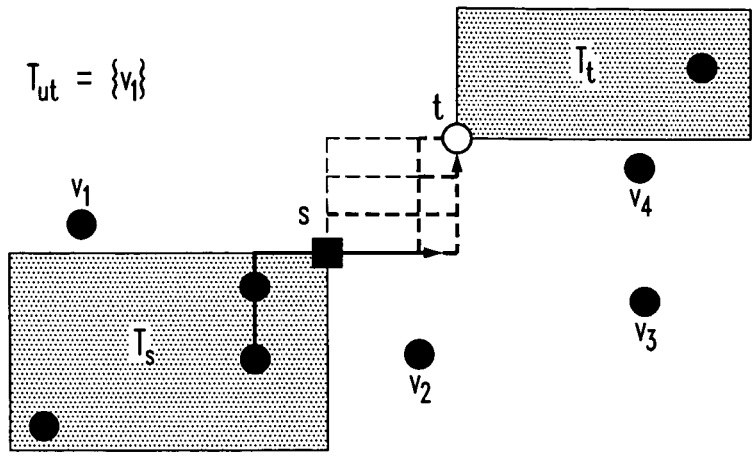

FIG. 9

Procedure Biasing_Order_Value $(v, t, Tree, T, G)$
*Input*: Source $s$, Vertex $v$, Target $t$, Set of targets $T$, Graph $G$.
*Output*: Value of the bias number $b(v)$ for ordering the open list.
1. Compute the unaffected region $R_s$ that is in the opposite quadrant of $s$ from $t$.
2. Compute the unaffected region $R_t$ that is in the opposite quadrant of $t$ from $s$.
3. Let $T_s$ and $T_t$ be the set of targets in $R_s$ and $R_t$.
4. Determine the set of vertices $T_u$ that are closer to the tree than to the rectangle defined by $s$ and $t$.
5. Compute the set of affected targets $T_{affected} = T - (T_s \cup T_t \cup T_u)$
6. Compute the distance $d_t$, $t \in T_{affected}$.
7. Compute the centroid $(x_c, y_c)$ as explained earlier.
8. Compute $b(v) = |x_v - x_c| + |y_v - y_c|$.
9. return $b(v)$.

end Procedure Biasing_Order_Value $(v, t, Tree, T, G)$

METHODS AND APPARATUS FOR PROVIDING FLEXIBLE TIMING-DRIVEN ROUTING TREES

FIELD OF THE INVENTION

The present invention relates generally to wire routing processes and, more particularly, to techniques for providing a flexible timing-driven routing tree.

BACKGROUND OF THE INVENTION

Interconnect routing is a process of determining the wires needed to connect sets of terminals in a circuit. Each set of terminals is defined as a net, or network, and is composed of a source, or driver, and one or more sinks. Wires are defined so that all terminals of the same net become electrically equivalent. Global routing is a process of determining the net routing topology, which forms a tree structure, or a connected acyclic graph. Special nodes termed Steiner nodes are introduced by the router to create branching points for wires in such a way that the route meets the desired goals. A routing tree with Steiner nodes is referred to as a Steiner tree. It is well known that algorithms for determining minimum-length Steiner trees are very difficult and fall into the NP-Hard class of problems, see for example, M. R. Garey et al., "The Rectilinear Steiner Tree is NP-Complete," SIAM Journal on Applied Mathematics, Vol. 32, No. 4, 1977, pp. 826-834.

A critical sink of a net is one for which the time taken for a signal to travel from the source to that sink is to be minimized. All other sinks are considered non-critical. In conventional routing, there is no differentiation between critical and non-critical sinks. Instead, the goal is simply to minimize the total wire length. In timing driven routing, the goal is to minimize the time taken for a signal to traverse from the source to critical sinks and, as a secondary goal, minimize the total wire length connecting all the non-critical sinks.

Typically the time taken for a signal to reach a particular sink from the source is determined by the total wire length of the wiring as well as the route from the source to the sink under consideration. It is desirable that the total capacitance of wires connected to the wire from source to critical sink be minimized, while the total wiring of the entire route to be minimized. However, these two requirements are often conflicting.

As feature sizes decrease with scaling, interconnect delays play an ever increasing role in determining the performance of a VLSI design. Routers in today's designs require timing awareness to optimize interconnect delays to critical sinks. In order to effectively use interconnect delays during logic optimization, those algorithms utilized to generate minimal Rectilinear Steiner Routing Trees (RSRTs) must be very fast. To ensure similarity between routes generated during the final routing phase and the wiring estimates used by the logic and placement optimizations, it is important that wiring estimates used in the early stages of design mimic wiring data obtained from the final routing. It is therefore desirable that the same algorithms be used in both cases.

Due to varying design requirements, different nets may require different routing strategies. Minimizing wire delays often leads to solutions with direct paths from source to critical sinks that are not shared with other sinks. This is usually in direct conflict with the goal of minimizing total wire length. It is essential for routers to have the capacity to avoid blockages which could be layout obstacles or hard cores. Congestion mitigation is another important factor that also needs to be addressed by these Steiner tree algorithms. Such requirements coupled with timing considerations stress RSRT algorithms to their limits.

Most routers utilized in the early stages of design use a skeletal tree. See, for example, C. J. Alpert et al., "Fast and Flexible Buffer Trees that Navigate the Physical Layout Environment," Proc. of the $41^{st}$ DAC, June 7-11, pp. 24-29; C. J. Alpert et al., "Prim-Jijkstra Tradeoffs for Improved Performance-Driven Routing Tree Design," IEEE Trans. On Computer-Aided Design of Integrated Circuits and Systems, Vol. 14, No. 7, July 1995, pp. 890-896; K. D. Boese et al., "Near Optimal Critical Sink Routing," IEEE Trans. On Computer-Aided Design of integrated Circuits and Systems, Vol. 14, No. 12, July 1995, pp. 1417-1436; M. Borah et al., "An Edge Based Heuristic for Steiner Routing," IEEE Trans. On Computer-Aided Design of Integrated Circuits and Systems, Vol. 13, No. 12, July 1994, pp. 1563-1568; J. Cong et al., "Efficient Algorithms for the Minimum Shortest Path Steiner Arborescence Problem with Applications to VLSI Physical Design," IEEE Trans. On Computer-Aided Design of Integrated Circuits and Systems," Vol. 17, Iss. 1, January 1998, pp. 24-39; J. Cong et al., "Provably Good Performance Driven Routing," IEEE Trans. On Computer-Aided Design of Integrated Circuits and Systems, Vol. 11, No. 6, 1992, 732-752; M. Hanan, "On Steiner's Problem with Rectilinear Distance," SIAM Journal on Applied Mathematics," Vol. 30, 2976, pp. 255-265; J.-M. Ho et al., "New Algorithms for the Rectilinear Steiner Tree Problem," IEEE Trans. On Computer-Aided Design of Integrated Circuits and Systems, Vol. 9, No. 2, February 1990, pp. 185-193; X. Hong et al., "Performance-Driven Steiner Tree Algorithms for Global Routing," Proc. of the $30^{th}$ DAC, Jun. 14-18, 1993, pp. 177-181; and F. K. Hwang et al., "The Steiner Tree Problem," Annals of Discrete Mathematics, Vol. 53, Elsevier Science Publishers, Netherlands, 1992. These algorithms are dependent on the method used to generate the skeleton and lack the flexibility of maze routers.

On the other hand maze routers are either too time consuming or are not timing aware. See, for example, S.-W. Hur et al., "Timing-driven Maze Routing," IEEE Trans. On Computer-Aided Design of Integrated Circuit s and Systems, Vol. 19, No. 2, February 2000, pp. 234-241; S. Prasitjutrakul et al., "A Timing-Driven Global Router for Custom Chip Design," Proc. of the Int. Conf. on Computer-Aided Design, Nov. 11-15, 1990, pp. 48-51; and K. Suzuki et al., "A Hardware Maze Router with Application to Interactive Rip-Up and Reroute," IEEE Trans. On Computer-Aided Design of Integrated Circuits and Systems, Vol. 5, No. 4, October 1986, pp. 466-476.

Thus, it would be highly desirable to be able to provide flexible timing-driven routing trees that provide effective tradeoffs between wire length and timing.

SUMMARY OF THE INVENTION

The present invention provides techniques for providing a flexible RSRT algorithm based on maze search methods, which has the advantages of maze routers while at the same time is fast and can be used for wiring estimates during early design steps. The embodiments of the present invention are timing aware and flexible to avoid blockages and mitigate congestion, while also providing effective mechanisms for tradeoff between wire length and timing.

For example, in one aspect of the present invention a method of producing a flexible timing-driven routing tree is provided. Two or more target nodes are sorted in accordance with data criticality. A source-sink grid is built from one or more source nodes and the two or more target nodes. An initial routing tree is built comprising the one or more source nodes. A routing tree generation algorithm is executed on the initial routing tree, utilizing the sorted two or more target nodes and the source-sink grid in accordance with a user-defined timing factor to construct a flexible timing-driven routing tree. The user-defined timing factor specifies an extent of isolation for a routing path from a given one of the one or more source nodes to a given one of the two or more target nodes.

In an additional embodiment of the present invention, a routing tree generation algorithm is executed by initializing a current routing tree as the initial routing tree. It is determined if at least one of the two or more target nodes is unrouted. When at least one of the two or more target nodes is unrouted, a shortest path determination algorithm is executed from a given node of the current routing tree to an unrouted target node in accordance with the timing factor and the source-sink grid to form a new current routing tree, and repeating the determining step. When the two or more target nodes are routed, the current routing tree is defined as the flexible timing driven routing tree when the two or more target nodes are route.

In a further embodiment of the present invention, the shortest path determination algorithm is executed through compiling a prioritized list of nodes in accordance with a shortest path that passes through a given node and extends from a given one of the one or more source nodes to an unrouted target node of the two or more target nodes, and in accordance with the source-sink grid and the user-defined timing factor. A top node from the prioritized list of nodes is defined as a last defined node on a routing path from the given source node to the unrouted target node. Neighboring vertices of the last defined node are acquired on the routing path from the given source node to the unrouted target node for compilation of a prioritized list of vertices. A top vertex from the prioritized list of vertices is defined as the last defined node on the routing path from the given source node to the unrouted target node. It is determined if the last defined node on the routing path is the unrouted target node. The acquiring neighboring vertices, defining a top vertex, and determining steps are repeated when the last defined node on the routing path is not the unrouted target node. The current routing tree is retraced to produce a new current routing tree having a new routing path from the given source node to the unrouted target node when the last defined node on the routing path is the unrouted target node.

Wiring effects are becoming increasingly important in modern IC designs. The embodiments of the present invention improve maze routers for wiring by applying intelligent search techniques. A new Steiner tree algorithm is provided for routing that is timing, congestion and blockage aware. The methodologies of the present invention are flexible and can easily incorporate all the functionality of today's state of the art maze routers. Finally, the methodologies of the present invention are extremely fast and can be used in the early stages of design during logic optimizations as well as during actual routing where the required level of detail is greater.

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 3 is an outline of Algorithm Amaze A*, according to an embodiment of the present invention;

FIG. 4 is an outline of Algorithm Amaze Mult. $A^*_{mult}$, according to an embodiment of the present invention;

FIG. 5 is an outline of Algorithm Amaze Steiner $A^*_{Steiner}$, according to an embodiment of the present invention;

FIG. 6 is an outline of a first alternative critical-only algorithm, according to an embodiment of the present invention;

FIG. 7 is an outline of a second alternative heuristic target distance algorithm, according to an embodiment of the present invention;

FIG. 8 is a graph illustrating biasing, according to an embodiment of the present invention;

FIG. 9 is an outline of a biasing order value algorithm, according to an embodiment of the present invention;

DETAILED DESCRIPTION OF PREFERRED EMBODIMENTS

As will be illustrated in detail below, the present invention introduces techniques for providing flexible timing-driven routing trees having effective tradeoffs between wire length and timing.

Figure 1:
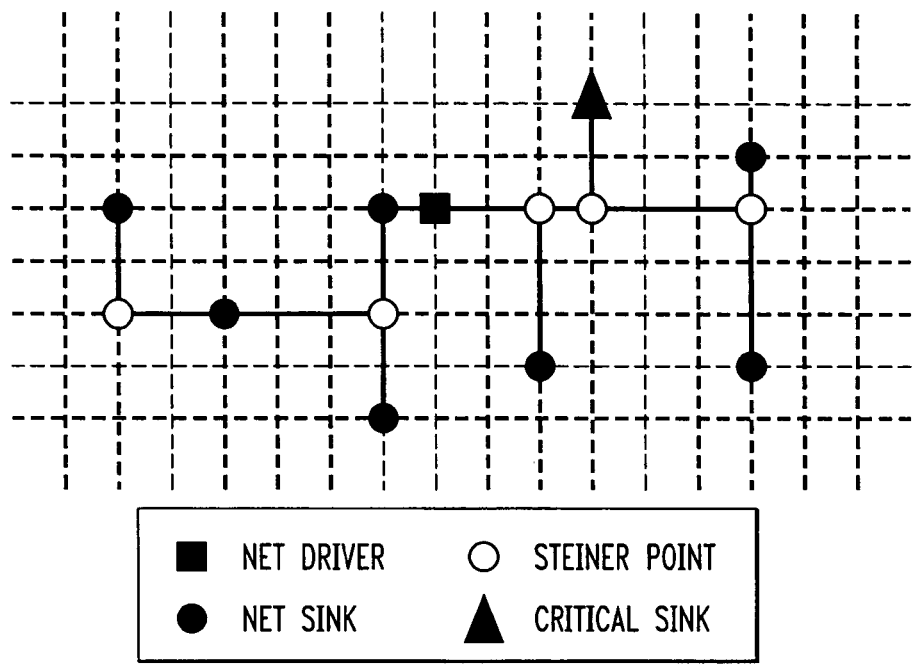
FIG. 1 is a graph illustrating terminal placement, according to an embodiment of the present invention.

Referring initially to FIG. 1, a graph illustrates the placement of a set of terminals, according to an embodiment of the present invention. The source, or net driver, in this embodiment is connected to eight sinks. One of the eight sinks is a critical sink and is illustrated as a triangle, while the remaining non-critical sinks are illustrated as filled circles. Steiner nodes are illustrated as unfilled circles, and interconnect wires are illustrated as line segments.

Figure 2:
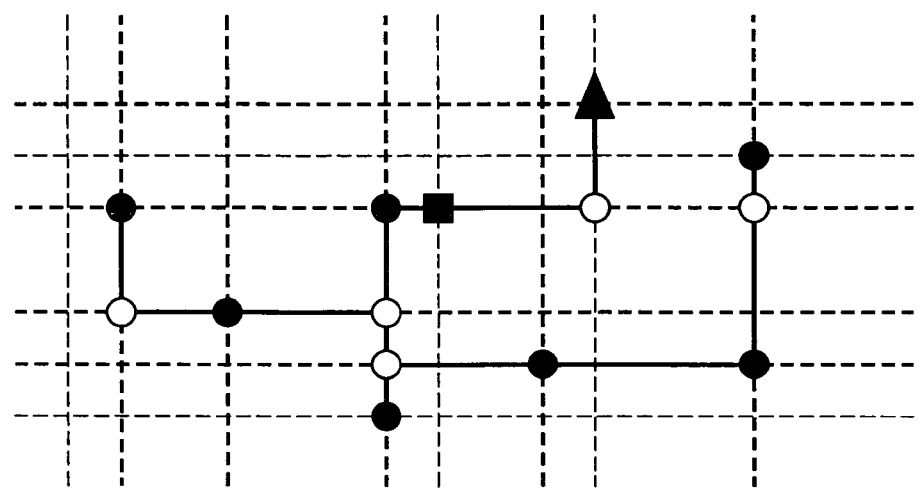
FIG. 2 is a graph illustrating an optimized timing route between terminals, according to an embodiment of the present invention.

A possible timing optimized route for the circuit of FIG. 1 is illustrated in FIG. 2, according to an embodiment of the present invention. In this embodiment, the path from the source to the critical sink is isolated from the rest of the net so that its distributed RC delay is minimized. Paths such as the one illustrated in FIG. 2 are not commonly generated by conventional Steiner Tree algorithms, but may be generated by the embodiments of the present invention.

The embodiments of the present invention provide methodologies for Steiner tree construction, which is based on a simple path search method, such as, for example, breadth first search (BFS), also know as maze routing. The embodiments of the present invention are graph-based, thus, a graph and path search mechanism are first defined. A graph G=(V, E) consists of a set of n vertices V={$v_1, v_2, \ldots, v_n$} and a set of $n_e$ edges E={$(v_i, v_j), 0<i,j \leq n_v, i \neq j$}. Each edge e∈E is associated with a cost c(e), also referred to as c(u, v) for an edge e=(u, v). The cost c(u, v) usually corresponds to the distance between the two vertices. A grid graph is a special type of graph where each node is located on a grid point or vertex (x, y) as shown in FIG. 1. An edge in a grid graph can only connect a vertex to its neighbors on the left, right, top or bottom, if such vertices exist. For purposes of the present invention it is assumed that G is a grid graph.

For a given subset of vertices U={$u_1, u_2, \ldots u_m$}⊆V, a tree is a fully connected acyclic graph. A Steiner tree comprises edges that connect vertices in the set U∪$V_1$, where $V_1$⊆V. It is often possible to generate a tree connecting the augmented set of vertices U∪$V_1$ so that it has better properties than one containing only vertices in U. A subset of the vertex set S={$s_1, s_2, \ldots s_l$}⊆V is defined as a source set and another subset T={$t_1, t_2, \ldots t_k$}⊆V is defined as a target set. Each vertex in s∈S is called source and each vertex t∈T is called a target vertex. When routing it is desirable to find a Steiner tree in G that connects all the sources and targets such that some specific property is minimized. This property could be the total cost of all edges in the tree representing the route, the timing to some set of critical targets, or a combination of both. Typically, the net of a circuit is represented by a graph where the input pin to the net is represented by a source and each output pin is represented by a target. Usually nets have only one input pin, but possibly more than one output pin.

In order to first determine the shortest path between a designated source and a designated target in the graph the Amaze A* algorithm is used, the concept of which is extended to route a net according to the embodiments of the present invention.

The A* algorithm is a directed search version of Dijkstra's algorithm, which is used to determine the shortest path between a source s and a target t in a graph. See, for example, T. H. Cormen et al., "Introduction to Algorithms," MIT Press, Cambridge Mass., 1989; and P. E. Hart et al., "A Formal Basis for the Heuristic Determination of Minimum Cost Paths," IEEE Transactions on System Science and Cybernetics, Vol. SSC-4, pp. 100-107, 1968. Definitions and properties of the A* algorithm are necessary to clearly specify and to replicate the methodologies of the present invention.

The A* algorithm takes a weighted graph G=(V, E) with a cost function c for each edge in E and finds the shortest path $P^*_{st}$ between two given nodes, source s and target t, whose total cost $C^* \Sigma_{e \in P^*_{st}} c(e)$ is minimum among all paths from s to t. It uses a primary data structure called the openlist L, and initializes the list with the source node s. Openlist L is a priority queue of vertices in which each vertex v, is prioritized in L according to the estimated length f(v) of the shortest path from s to t passing through v, and defined a f(v)=g(v)+h(v); where g(v) is the actual length of the shortest path from s to v, and h(v) is a heuristic estimate of the length of the shortest path from v to t. The algorithm repeatedly selects a vertex with the smallest value of f(v) from L for expansion, until t is selected at which point the algorithm terminates. When a vertex is chosen as a node for expansion of the path, the vertex is marked as closed. At the same time, each neighbor u of the new node is inserted into openlist L in a prioritized order determined by the value f(u).

The heuristic h(v) is said to be admissible if and only if h(v) is less than or equal to the length of the actual shortest path from v to t. It has been shown that with an admissible heuristic function, Algorithm A* will always find the shortest source to target path. The simplest heuristic estimate for the distance between two vertices u=($x_u, y_u$) and v=($x_v, y_v$) in a grid graph is the Manhattan distance ($|x_v-x_u|+|y_v-y_u|$), which can be computed extremely fast. The computation speed of Algorithm A* increases as h(v) becomes closer in value to the length of the actual shortest path from v to t. Referring now to FIG. 3, an outline of Algorithm A* is shown, according to an embodiment of the present invention.

Algorithm A* may be utilized to generate Steiner trees. Using a technique such as Kruskal's shortest path algorithm it is possible to generate a spanning tree with minimum length that connects all the sinks. See, for example T. H. Cormen et al. As described above, the use of intermediate branching points allows for the generation of an interconnection of the sinks having improved properties. In order to build Steiner trees using path search methods, vertices are connected that are nodes of previously generated paths including those that are not targets of the path.

Algorithm $A^*_{mult}$ extends Algorithm A* to determine the shortest path from some source s∈S, and some target t∈T. This is accomplished by initializing the open list with all the vertices in S. For multiple targets, the heuristic estimator needs to be modified. For each new vertex v that is opened the heuristic h is computed for all targets and the best target is chosen to determine the cost f(v) for the generated vertex v. While this appears to be time consuming, it is often possible to cleverly choose targets so that there is minimum impact on the run time. Referring now to FIG. 4, an outline of $A^*_{mult}$ (S, T, G) is shown, according to an embodiment of the present invention.

Algorithm $A^*_{Steiner}$ computes a Steiner tree by repeatedly using Algorithm $A^*_{mult}$. It is assumed that all inputs and outputs of the net are to be routed on a grid that contains orthogonal wiring tracks along which wire segments are to be assigned as shown in FIG. 1. If a grid is not specified, a Hanan grid is used which is obtained by drawing vertical and horizontal lines through each source and sink of the net as shown in FIG. 2. See, for example, M. Hanan et al. The input to the net is designated as the source s and put it in openlist L. The set of outputs of the net constitute the set T of targets. Using Algorithm $A^*_{mult}$ (S, T, G) the shortest path is found between s and a target t∈T. Each vertex designated as a node along this new path is opened. Finally, a path is found from this node set to a next target and the process is continued until all the targets are connected. Referring now to FIG. 5, an outline of $A^*_{Steiner}$ is shown, according to an embodiment of the present invention.

In accordance with embodiments of the present invention, Algorithm $A^*_{mult}$ is modified to obtain timing aware Steiner trees. Specifically, let T={$t_1, t_2, \ldots, t_m$} be a set of m targets. Without loss of generality, it is assumed that targets $t_1 \ldots t_k$, $1 \leq k \leq m$ are timing critical. The criticality of a node is represented by an integer number larger than 1. The timing driven routing problem is one in which targets are provided in order of priority and routes are generated in such a way that source to target timing is minimized in order of the criticality specified. Typically, there are few timing critical nets with the remaining targets being connected in such a way that wire length is minimized. To perform timing driven routing several features are added to Algorithm $A^*_{Steiner}$ (s, T, G).

Algorithm $A^*_{Steiner}$ (s, T, G) searches for the shortest path from a set of sources S to a particular target t∈T in each iteration of the loop. Let $T_c \subseteq T$ be the set of targets that are most critical such that all targets in $T_c$ have the same criticality. Two alternative methods of routing are provided for nets with such critical nets.

In the first alternative methodology, critical-only routing, vertices in $T_c$ are routed using Algorithm $A^*_{mult}$ (s, $T_c$, G). Vertices in $T-T_c$ are not treated as sink vertices except for the purposes of biasing which is explained in further detail below. Once all targets in $T_c$ are routed, the sets T and $T_c$ are updated and the routing process repeated until T is empty. Referring now to FIG. 6, an outline of a critical-only algorithm is shown, according to an embodiment of the present invention.

In the second alternative methodology, all sinks are considered simultaneously. Sinks that are in the path from a source to a critical sink may be routed before all the other critical sinks are routed. In most cases, routes produced by hybrid routing will be no different from those produced by critical-only routing, though it is possible to create examples where there are differences. In this methodology, Algorithm $A^*_{Steiner}$ (s, T, G) is used as is except that the heuristic function is computed slightly differently. Referring now to FIG. 7, an outline of a heuristic target distance algorithm is shown, according to an embodiment of the present invention.

Let C* be the optimum cost of reaching the target t from s. Algorithm A* expands a path to a next vertex v with f(v)<C* and only those vertices with f(v)≦C*. In routing, where the graph is a regular grid, edge costs are uniform and the use of a heuristic estimate based upon Manhattan distance leads to cases during the algorithm's execution where several vertices have the same value of f=C*. These cases are referred to as critical ties. To get the most efficiency from A*, a mechanism is needed to avoid expanding all nodes with critical ties. Vertices that are closer to the target are chosen to break ties. This is done by storing a count cs(v) for each vertex v indicating how far it is from the source. The vertex v with the greatest value of cs(v) is chosen.

Due to the uniformity of the grid graph, there could be several vertices v with the same value of f(v) as well as cs(v). In order to obtain routes with the best wire length or timing characteristics, a biasing technique is utilized Biasing uses a reference position called a biasing point that serves the purpose of choosing the appropriate vertex for expansion when ties occur.

The biasing point is calculated as follows. First, a set of affected targets is determined by analyzing the targets that are yet to be routed. $T_s$ is defined as the set of vertices in the quadrant with origin s that is diagonally opposite to t and $T_t$ is defined as the set of vertices in the quadrant with origin t that is diagonally opposite to s. Vertices in $T_s \cup Tt$ will not be affected by the route chosen. Likewise vertices in the set $T_u$, the set of vertices closer to the tree than the bounding box with corners s and t, will be unaffected. Therefore, $T_{affected}=T-(T_s \cup T_t \cup T_u)$. Referring now to FIG. 8, a graph illustrates biasing, according to an embodiment of the present invention, with the sets $T_s$, $T_t$ and $T_u$. If $(x_t, y_t)$ is the coordinate of a target t∈$T_{affected}$ whose distance from the vertex v is $d_t$, then the bias point is computed as $$x_c, y_c) = \left( \frac{\sum_{t \in T_{affected}} x_t/d_t}{\sum_{t \in T_{affected}} 1/d_t}, \frac{\sum_{t \in T_{affected}} y_t/d_t}{\sum_{t \in T_{affected}} 1/d_t} \right).$$

Vertices with the same value of f(v) in openlist L are ordered by their distance to the bias point. Referring now to FIG. 9, an outline of a biasing order value algorithm is shown, according to an embodiment of the present invention.

Though biasing helps to reduce the total wire length, it has the unfortunate effect of sharing the path P from source to critical target with paths to other targets thereby increasing the capacitive load on P. In order to isolate the critical paths and make them less likely to be shared, repulsive biasing is used for critical targets. Repulsive biasing tends to route wires that connect the source to critical targets in such a way that ample space is available for routing non-critical wires.

Depending upon the technology and design parameters used, it may be necessary to isolate wires to critical targets, or share this wire with other targets either partially or fully. In other words the capability of wire length to timing trade-off is a necessary feature that routing algorithms need to provide. Means of having such flexibility is provided by introducing a user defined parameter called the timing factor tf. The timing factor typically has a value between 0 and 2 though there may be cases where the value is greater than 2. By setting the parameter to 0 all wires are available for sharing. As this factor increases in value, the extent of sharing of wires to critical sinks is reduced. In most cases a value of 2 prevents all sharing of wires to critical sinks, though there are a few cases where a higher value for timing factor is required. While the use of parameters similar to timing factor to reduce source to target path length may have been considered in the past, there has never been an attempt to isolate specific paths by assigning timing factor values greater than 1 to them.

Figure 10:
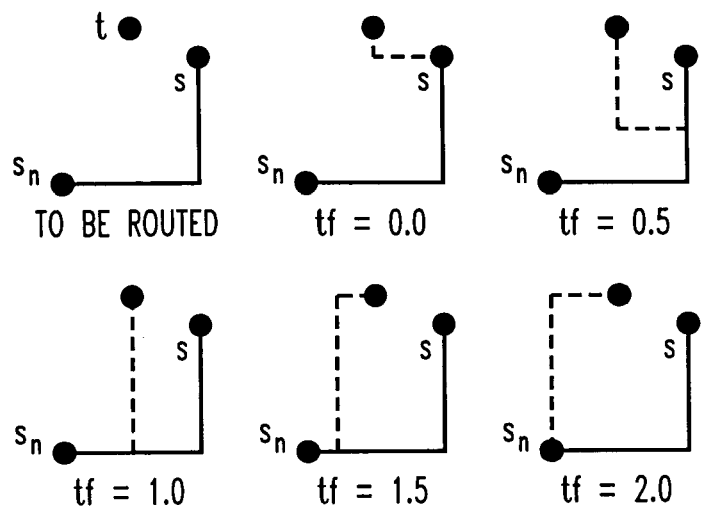
FIG. 10 is a graph illustrating the effect of a timing factor on route types, according to an embodiment of the present invention.

In Step 1 of Algorithm $A^*_{mult}$(S, T, G) shown in FIG. 4, the value of g(s) was set to 0 for each s∈S. This initialization is modified using the timing factor tf. If $s_n$ is the source of the net then g(s) for any other source is set to be tf*d($s_n$, s), where d($s_n$, s) is the distance along the route from $s_n$ to s, see, for example, FIG. 10, which illustrates the effect of a timing factor on route types, according to an embodiment of the present invention. Note that by increasing the value of tf the route from $s_n$ to s becomes increasingly independent of the route from $s_n$ to t. The amount of wire shared between the two routes decreases to 0 as tf approaches 2. In order to pick the best value of tf the algorithm is run for a range of values of tf and the best value is chosen.

Figure 11:
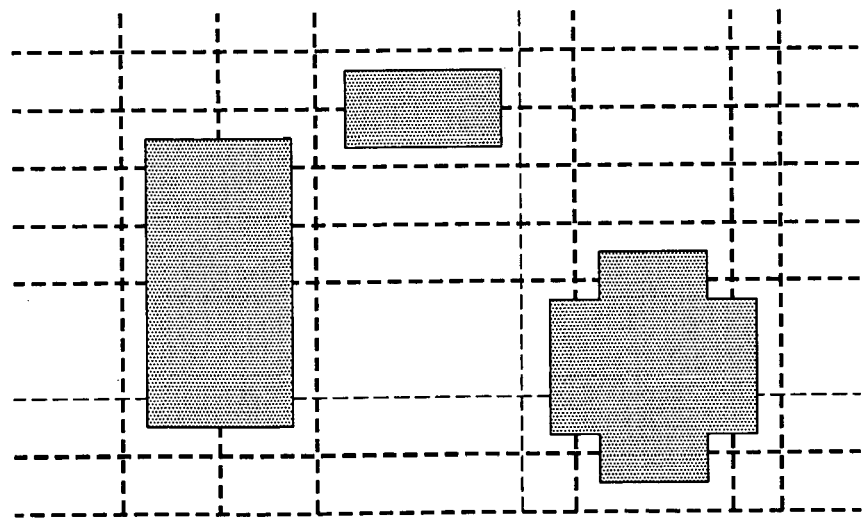
FIG. 11 is a grid graph illustrating blockages, according to an embodiment of the present invention.

Maze routers are inherently blockage aware. By modifying the graph so that regions with wiring blockages are deleted the same algorithm can be used in the presence of blockages. Deleting these vertices also involves deleting any edges incident upon them. Referring now to FIG. 11, a grid graph illustrates blockages, according to an embodiment of the present invention.

Figure 12:
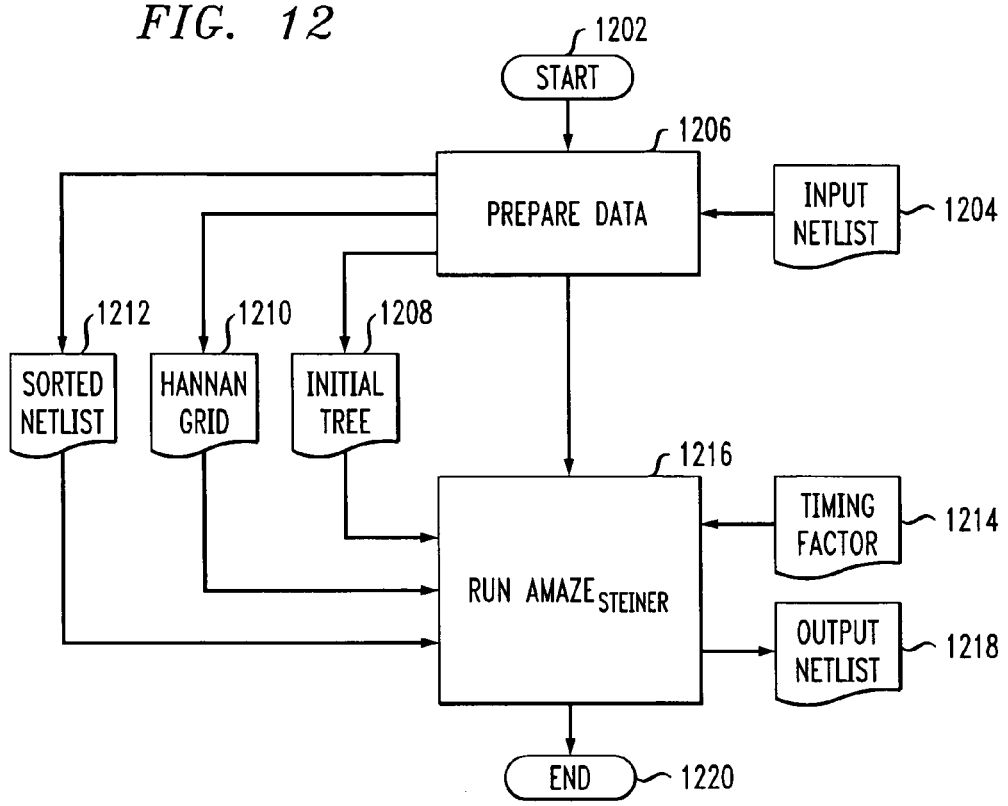
FIG. 12 is a flow diagram illustrating a top level routing methodology, according to an embodiment of the present invention.

Referring now to FIG. 12, a flow diagram illustrates a top level routing methodology, according to an embodiment of the present invention. The methodology begins in block 1202, and an input netlist 1204 of sources and targets is supplied. Data is prepared in block 1206, resulting in an initial tree 1208, a Hanan grid 1210, and a sorted netlist 1212. A timing factor 1214 is also supplied, and $A^*_{Steiner}$ is run in block 1216. This results in an output netlist 1218, terminating the methodology in block 1220.

Figure 13:
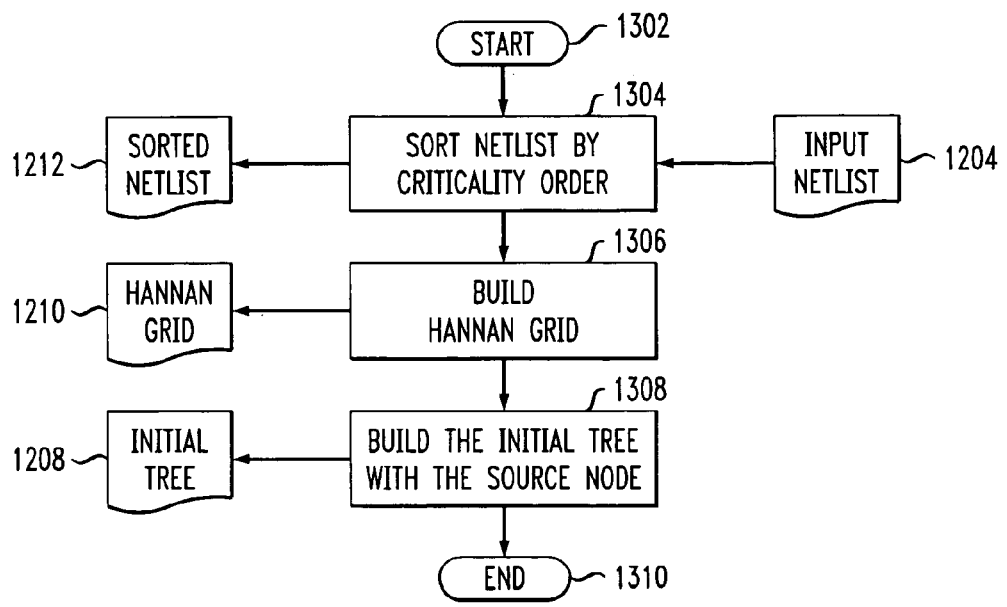
FIG. 13 is a flow diagram illustrating a data preparation methodology, according to an embodiment of the present invention.

Referring now to FIG. 13, a flow diagram illustrates a data preparation methodology, according to an embodiment of the present invention. This may be considered a detailed description of block 1206 in FIG. 12. The methodology begins in block 1302, and input netlist 1204 is supplied. Targets from input netlist 1204 are sorted in order of criticality in block 1304, resulting in sorted netlist 1212. A Hanan grid 1210 is built in block 1306 by drawing vertical and horizontal grid lines through each source and target. The points at which these vertical and horizontal gird lines cross are termed vertices. An initial tree 1208 is built having the source node from input netlist 1204 in block 1308. The methodology terminates in block 1310.

Figure 14:
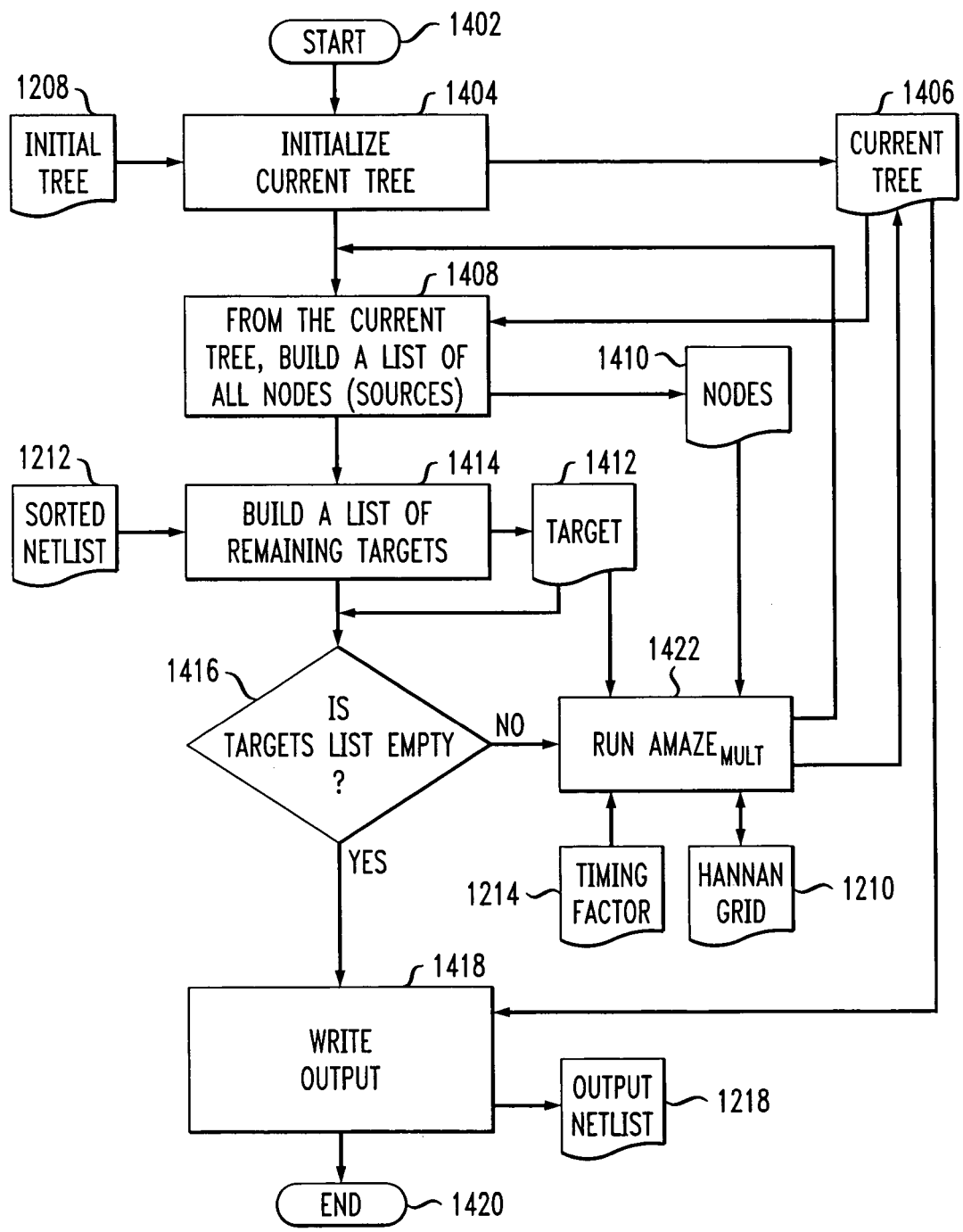
FIG. 14 is a flow diagram illustrating an $A^*_{Steiner}$ methodology, according to an embodiment of the present invention.

Referring now to FIG. 14, a flow diagram illustrates an $A^*_{Steiner}$ methodology, according to an embodiment of the present invention. This may be considered a detailed description of block 1216 in FIG. 12. The methodology begins in block 1402, and the initial tree 1208 is supplied. In block 1404, initial tree 1208 is initialized as a current tree 1406. In block 1408, a list of all nodes is built from current tree 1406. When current tree 1406 is defined as initial tree 1208, the list of all nodes includes only the source node. Sorted netlist 1212 is supplied and a list of remaining targets 1412 that have yet to be routed is built in block 1414. In block 1416 it is determined if targets list 1412 is empty. If targets list 1412 is not empty, timing factor 1214 and Hanan grid 1210 are supplied and $A^*_{mult}$ is run in block 1422 utilizing nodes 1410 and targets 1412, which results in a new current tree 1406 having a new path from the source to a target. The methodology then repeats at block 1408 until the targets list is empty and all targets are routed. When targets list 1412 is empty, current tree 1406 is provided as a flexible timing driven routing tree and output netlist 1218 is provided in block 1418. The methodology terminates in block 1420.

Figure 15:
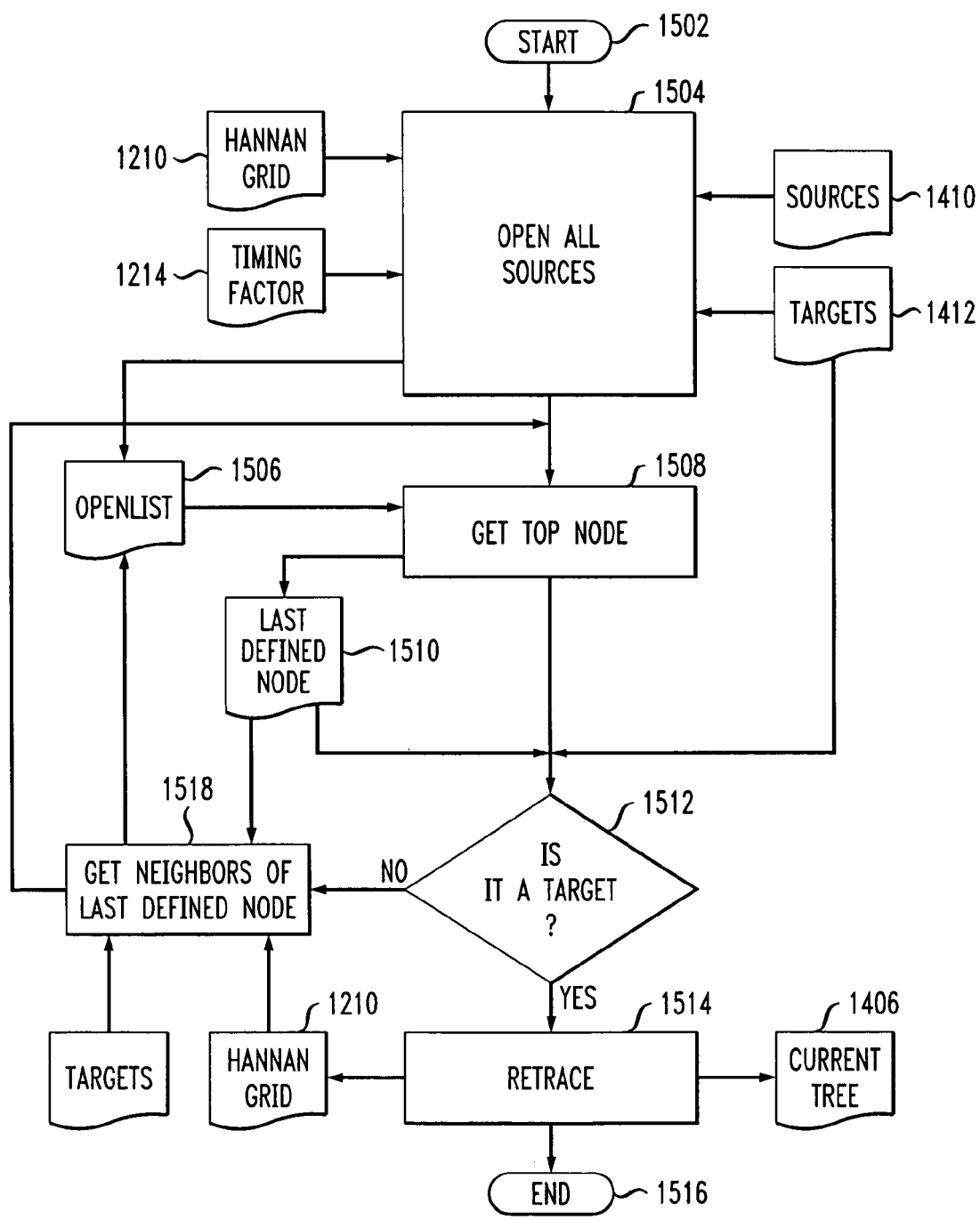
FIG. 15 is a flow diagram illustrating an $A^*_{mult}$ methodology, according to an embodiment of the present invention.

Referring now to FIG. 15, a flow diagram illustrates an $A^*_{mult}$ methodology, according to an embodiment of the present invention. This may be considered a detailed description of block 1422 in FIG. 14. The methodology begins in block 1502, and Hanan grid 1210, nodes 1410, targets 1412, and timing factor 1214 are supplied. In block 1504 all nodes are opened and inserted into an openlist 1506. In block 1508, a top node is acquired from openlist 1506 and made a last defined node 1510 of the routing path to a given target. In block 1512, it is determined if last defined node 1510 is a target node 1412. If last defined node 1510 is not a target node 1412, neighbors of last defined node 1510 are acquired in block 1518 utilizing vertices of Hanan grid 1210, resulting in a new openlist 1506 of vertices. The methodology then repeats at block 1508, making a top vertex a last defined node in the routing path to the given target, until a last defined node 1510 is a target 1412. When last defined node 1510 is a target 1412, a routing tree is retraced in block 1514, resulting in a new current tree 1406 that includes the newly formed path from a source node to a target, and the methodology terminates in block 1516.

Figure 16:
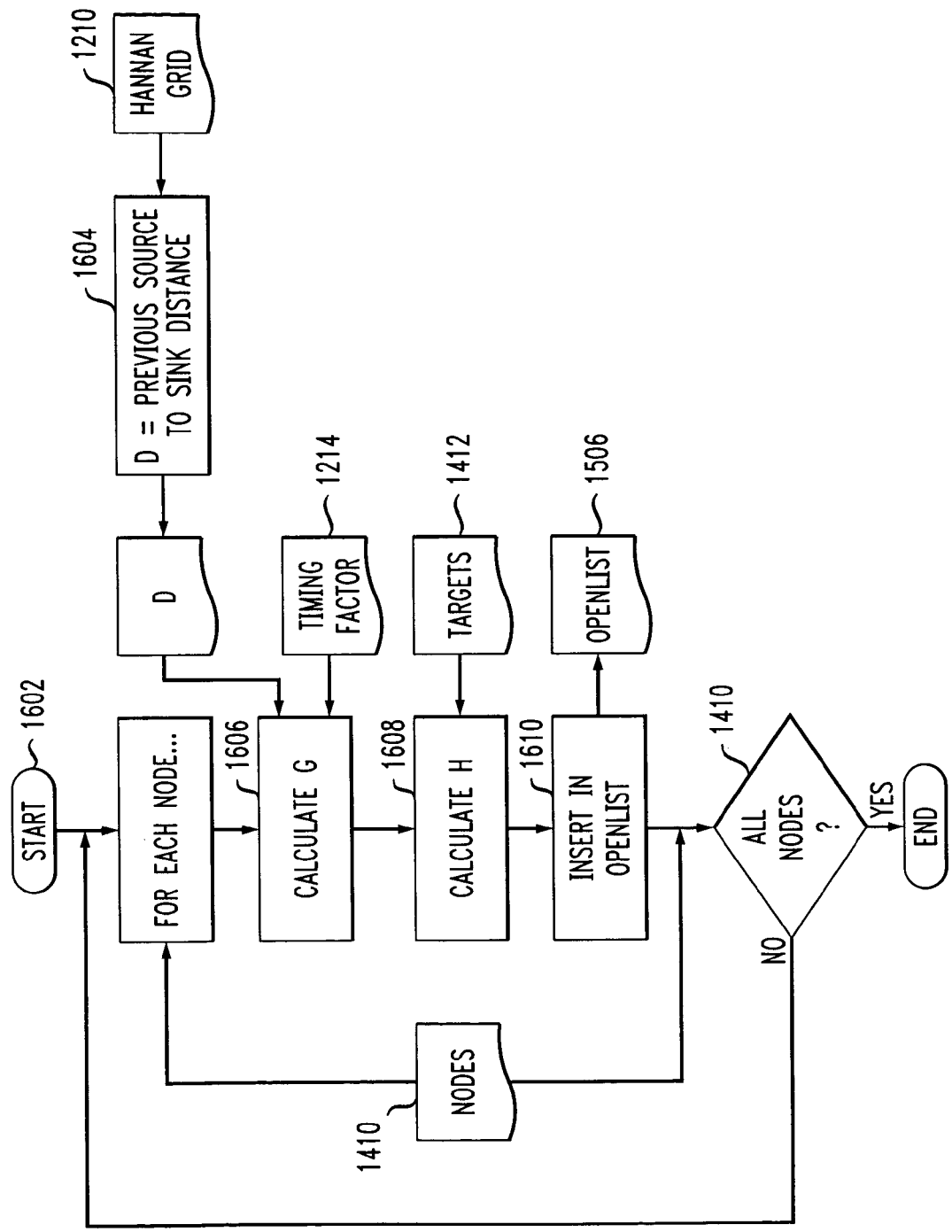
FIG. 16 is a flow diagram illustrating a source opening methodology, according to an embodiment of the present invention.

Referring now to FIG. 16, a flow diagram illustrates a node opening methodology, according to an embodiment of the present invention. This may be considered a detailed description of block 1504 in FIG. 15. The methodology begins in block 1602, and nodes 1410 are provided. Hanan grid 1210, enables a computation of the previous source to sink distance D in block 1604. For each node, g is calculated in block 1606 using D and timing factor 1214. As described above, g is the actual length of the shortest path from the source node to the given node. In block 1608, h is calculated using targets 1412. As described above, h is the heuristic estimate of the length of the shortest path from the given node to the target. In block 1610, the nodes are inserted into openlist 1506 in a prioritized order according to a shortest combined length of g and h. In block 1612, it is determined if the methodology has executed for each node 1410. If all nodes 1410 have been inserted, the methodology terminates in block 1614. If all nodes 1410 have not been inserted, the methodology repeats for the next node.

Figure 17:
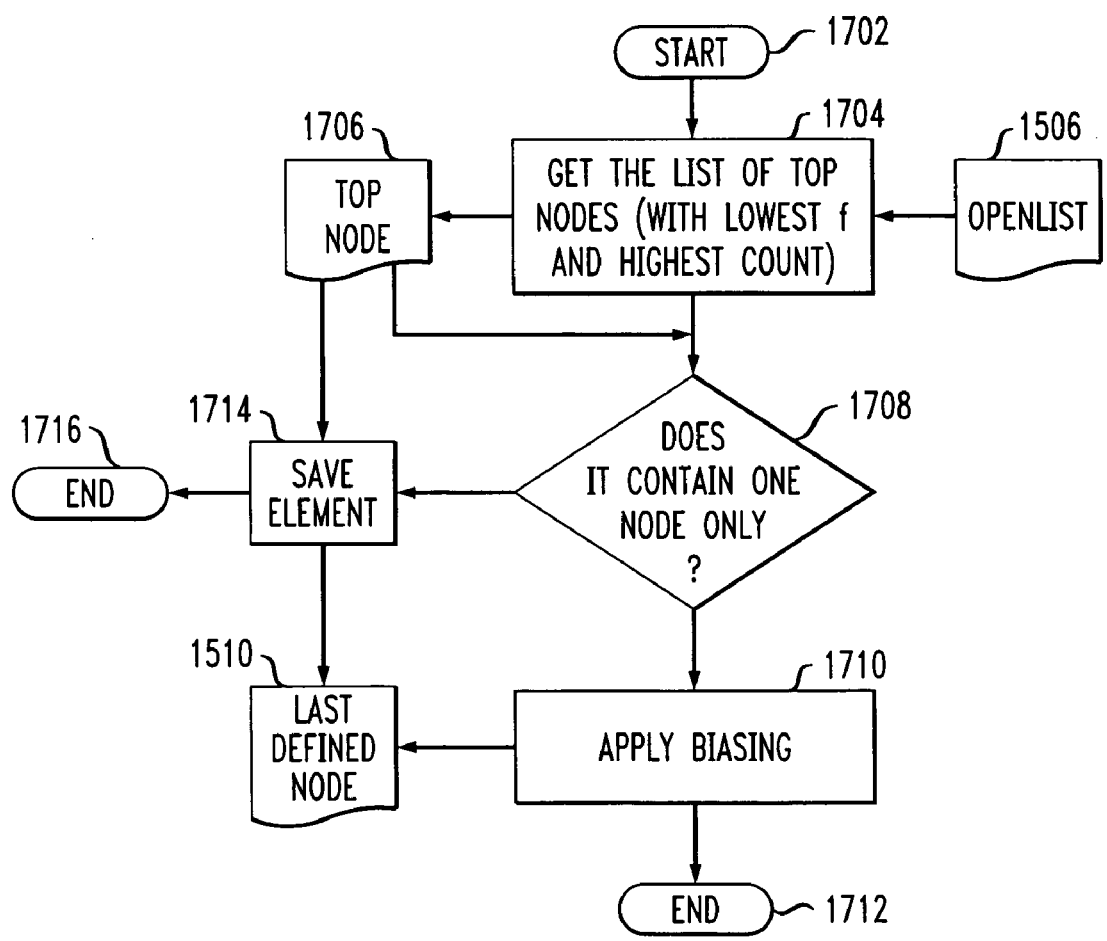
FIG. 17 is a flow diagram illustrating a top node acquisition methodology, according to an embodiment of the present invention.

Referring now to FIG. 17, a flow diagram illustrates a top node or vertex acquisition methodology, according to an embodiment of the present invention. This may be considered a detailed description of block 1508 in FIG. 15. The methodology begins in block 1702 and openlist 1506 is supplied. In block 1704, a list of top nodes or vertices 1706 is acquired. Top nodes or vertices 1706 have the lowest f and highest count. As described above, f is the combined length of a shortest path from the source node to the given node or vertex, and from the given node or vertex to the target node. In block 1708 it is determined if the list has a single node. If the list more than one node, biasing is applied in block 1710, resulting in establishment of a new node 1510 and the methodology terminates in block 1712. If the list has a single node or vertex, the element is saved in block 1714 resulting in a new node 1510 and the methodology terminates in block 1716.

Figure 18:
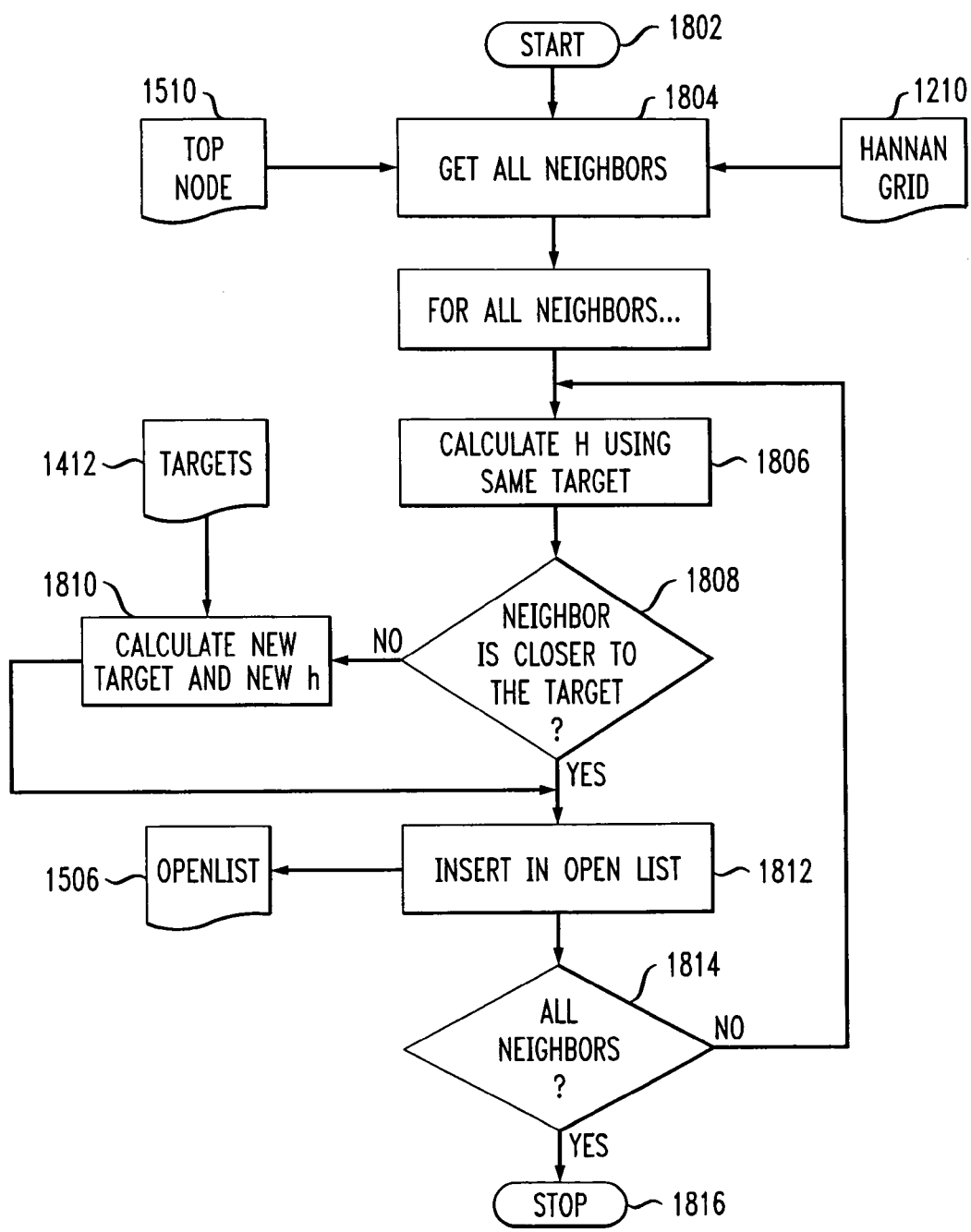
FIG. 18 is a flow diagram illustrating a top node neighbor acquisition methodology, according to an embodiment of the present invention.

Referring now to FIG. 18, a flow diagram illustrates a new node neighbor acquisition methodology, according to an embodiment of the present invention. This may be considered a detailed description of block 1518 in FIG. 15. The methodology begins in block 1802 and new node 1510 and Hanan grid 1210 are supplied. In block 1804, all neighboring vertices of top node 1510 are acquired. For each neighboring vertex, h is calculated using the same target in block 1806. In block 1808, it is determined if the neighbor is closer to the target. If the neighbor is not closer to the target, a new target and a new h is calculated in block 1810. The neighboring vertex is then inserted into openlist 1506 in block 1812. If the neighbor is closer to the target, the neighbor is inserted into openlist 1506 in block 1812 in a prioritized order as described above. In block 1814, it is determined if all neighboring vertices have been analyzed. If all neighboring vertices have been analyzed, the methodology terminates in block 1816. If all neighboring vertices have not been analyzed, the methodology repeats at block 1806.

Figure 19:
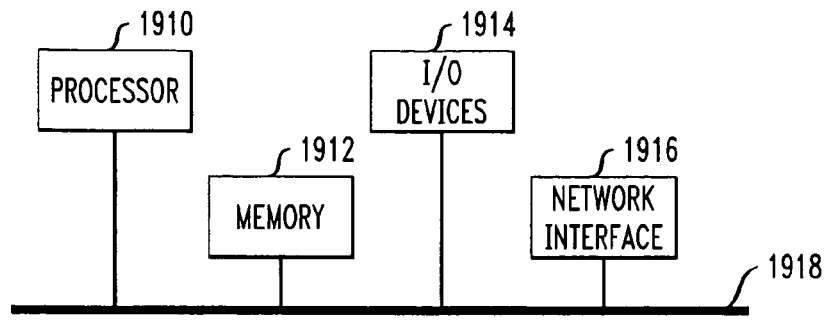
FIG. 19 is a block diagram illustrating an exemplary hardware implementation of a computing system in accordance with which one or more components/methodologies of the invention may be implemented, according to an embodiment of the present invention.

Referring now to FIG. 19, a block diagram illustrates an exemplary hardware implementation of a computing system in accordance with which one or more components/methodologies of the invention (e.g., components/methodologies described in the context of FIGS. 1-18) may be implemented, according to an embodiment of the present invention.

As shown, the computer system may be implemented in accordance with a processor 1910, a memory 1912, I/O devices 1914, and a network interface 1916, coupled via a computer bus 1918 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc.

In addition, the phrase "input/output devices" or "I/O devices" as used herein is intended to include, for example, one or more input devices (e.g., keyboard, mouse, scanner, video camera, etc.) for entering data to the processing unit, and/or one or more output devices (e.g., speaker, display, printer, etc.) for presenting results associated with the processing unit.

Still further, the phrase "network interface" as used herein is intended to include, for example, one or more transceivers to permit the computer system to communicate with another computer system via an appropriate communications protocol.

Software components including instructions or code for performing the methodologies described herein may be stored in one or more of the associated memory devices (e.g., ROM, fixed or removable memory) and, when ready to be utilized, loaded in part or in whole (e.g., into RAM) and executed by a CPU.

Primary improvements over other methods can be characterized into three categories: speed, quality of results and flexibility of the algorithm. Using the directed search mechanism considerably improves the speed over conventional maze routers. In the absence of blockages, the heuristic function h(v) is exact and the router finds the route from source to sink in a minimum number of steps, or shortest time compared to other path search algorithms. In fact these computation times are comparable to Steiner computations that are not based on maze routing.

Blockages are often ignored when computing Steiner trees for wiring and timing estimates that are required during the early phases of design such as synthesis. Furthermore, a Hanan grid usually suffices for routing at this early stage. Both these features greatly enhance the ability to increase the speed of the algorithm. This mode of operation is referred to as the fast mode. During the latter stages of design, when accurate wiring is involved a finer grid is used and all wiring blockages are included. Due to the requirements at this stage, conventional methods often use maze routing. Since the router is an extremely fast maze router, speed at this stage is gained as well. This mode of operation is referred to as the accurate mode.

Figure 20:
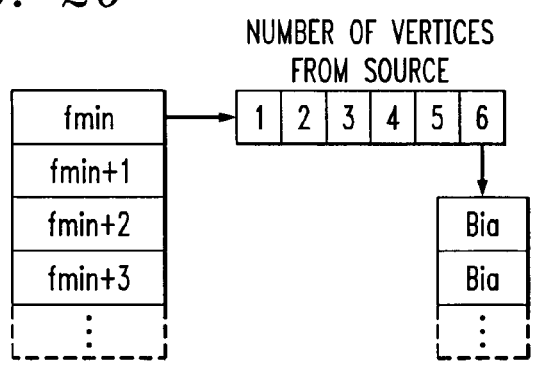
FIG. 20 is a diagram illustrating an open list structure, according to an embodiment of the present invention.

The range of estimated source to sink values is often limited in a grid graph. Due to this property it is possible to store the open list in a vector of vectors indexed first by the f values and then by the distance measured in number of vertices from a source to the vertex being processed. This ensures that inserting new elements in the list or removing the first element from the list is extremely fast. Referring now to FIG. 20, a diagram illustrates an open list structure, according to an embodiment of the present invention.

The algorithm scales very well with the size of the net because for a given grid the average computation time increases linearly with the number of pins in the net.

Using specialized data structures for the open list when routing designs with blockages it is possible to improve the speed of the algorithm.

The embodiments of the present invention use specialized techniques such as biasing, critical sink ordering and the use of timing factors. This enables the production of extremely good timing results when desired while at the same time producing extremely good wire lengths in the absence of critical sinks. The algorithm is therefore very good at routing critical-nets.

Besides timing the algorithm also optimizes wire length. The biasing techniques in the absence of critical sinks produce near optimal wire lengths. Hence the algorithm finds applications in routing non-critical nets as well.

The present invention may be operated in either a fast mode or an accurate mode. While the results obtained from the fast mode may vary slightly from that obtained in the accurate mode, they are very similar. Hence estimates made during early design are based on actual routing that is expected during actual routing. This is normally not the case as estimates used during logic optimization are often based upon by techniques other than maze routing whereas actual routers use maze routing. Therefore, an improved correlation between estimated timing and wire length values and the actual ones is provided.

Figure 21:
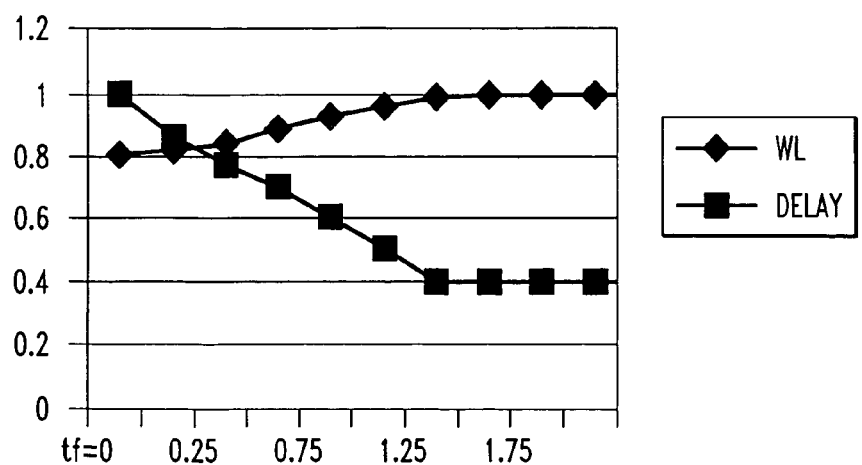
FIG. 21 is a graph illustrating a wire length and timing improvement tradeoff, according to an embodiment of the present invention.

Use of the timing factor allows the algorithm to provide an effective mechanism for trading off between the total wire length of a net and the source to target timing. Depending on design requirements and characteristics this trade off can be leveraged by the user. Typical trade-off characteristics are illustrated in FIG. 21, which shows that the fractional improvement in timing improvement is much greater than the percentage penalty paid in wire length.

Being an engine driven by maze routing, the algorithm can easily be extended to include other research work pertaining to routing. Wiring blockage avoidance is another measure of flexibility of the algorithm. By using the Lower bound comparative search (LCS) algorithm instead of the A* algorithm as the core the algorithm can easily be extended to mitigate congestion without compromising speed in any substantial way. See, for example, M. Johan et al., "A New Bidirectional Heuristic Shortest Path Search Algorithm," International ICSC Congress on Artificial Intelligence and Applications, Wollongong, Australia, Dec. 12-15, 2000.

The embodiments of the present invention provide the advantages of avoiding blockages while simultaneously optimizing timing. Previous Steiner algorithms failed to provide both features simultaneously in acceptable run time. This ability makes the algorithm suitable to many applications in the synthesis flow.

Due to the fact that the present invention is timing aware, it allows for extremely aggressive and more accurate optimizations during the early design phase. Since the routing algorithm is very fast it allows for several iterations of the design cycle.

The present invention allows for the flexibility of trading off wire length with timing so that both timing and routability can be addressed simultaneously. Estimates produced by the present invention are precise and reflect values that can be expected during final routing since the same methodology is used during estimation as that used during final routing.

Buffer insertion programs generally insert buffers along Steiner trees created for the net to be buffered. See, for example, C. J. Alpert et al., "Fast and Flexible Buffer Trees that Navigate the Physical Layout Environment. By generating timing aware Steiner trees that avoid silicon blockages the present invention assists buffer insertion programs by routing only in areas where there is space to locate buffers. Blockage aware Steiner trees are used to define global routes.

Maze routing is the most popular and effective algorithm for global routing. The methodologies of the present invention easily fit in existing frameworks. As in global routing, the existing maze routing techniques could be easily extended to accommodate the proposed approach with potential gains in timing of the critical nets. The algorithm has all the flexibility of maze routers and any application such as routing for noise and cross-talk mitigation designed for maze routers can easily be incorporated in our algorithm as well. Since the algorithm is much faster than conventional maze routers improvements will be reflected in these applications as well.

By merely extending the grid graph to a three dimensional grid the methodologies of the present invention may be utilized for multilayer routing. Even wiring for early estimates can leverage this capability to produce more optimistic designs. By using the multilayer capability of the present invention, it can be effectively used to be via aware. Vias are the metal interconnections required to connect wires on one routing layer to wires in another wiring layer.

Congestion can be modeled as cost function on the graph. The methodologies of the present invention can easily incorporate this cost and route properly to avoid congestion. Also, using the LCS instead of the A* algorithm can help improve run time while mitigating congestion.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of producing a flexible timing-driven routing tree, the method comprising the steps of:

sorting two or more target nodes in accordance with data criticality;

building a source-sink grid from one or more source nodes and the two or more target nodes;

building an initial routing tree comprising the one or more source nodes; and executing a routing tree generation algorithm on the initial routing tree, utilizing the sorted two or more target nodes and the source-sink grid in accordance with a user-defined timing factor to construct a flexible timing-driven routing tree, wherein the user-defined timing factor specifies an extent of isolation between a first routing path and a second routing path, wherein the first routing path is between a given one of the one or more source nodes and a given one of the two or more target nodes, wherein there is no sharing between the first and second routing paths when the user-defined timing factor equals a first specific value, and wherein the amount of sharing between the first and second routing paths increases as the user-defined timing factor approaches a second specific value different from the first specific value;

wherein the step of executing a routing tree generation algorithm comprises the steps of:

initializing a current routing tree as the initial routing tree;

determining if at least one of the two or more target nodes is unrouted;

when at least one of the two or more target nodes is unrouted, executing a shortest path determination algorithm from a given node of the current routing tree to an unrouted target node in accordance with the timing factor and the source-sink grid to form a new current routing tree, and repeating the determining step; and defining the current routing tree as the flexible timing-driven routing tree when the two or more target nodes are routed;

wherein, in the step of executing a shortest path determination algorithm, the given node of the current routing tree is selected from at least one of the one or more source nodes and one or more nodes on a routing path from a given one of the one or more source nodes to a given one of the two or more target nodes;

wherein the step of executing a shortest path determination algorithm comprises the step of compiling a prioritized list of nodes in accordance with a shortest path that passes through a given node and extends from a certain one of the one or more source nodes to an unrouted target node of the two or more target nodes, and in accordance with the source-sink grid and the user-defined timing factor;

wherein the step of compiling a prioritized list of nodes comprises the step of calculating a length of a shortest routing path from the given source node to the given node in accordance with the user-defined timing factor, wherein the above steps are performed on a computing system comprising a memory and a data processor coupled to the memory.

* * * * *